United States Patent [19]

Nishiguchi et al.

[11] Patent Number: 5,285,399
[45] Date of Patent: Feb. 8, 1994

[54] CALCULATOR WITH EASILY ENTERABLE CONSTANT CALCULATION MODE

[75] Inventors: Shinichi Nishiguchi, Yamatokoriyama; Fumiaki Kawawaki, Nara, both of Japan

[73] Assignee: Sharp Kabushiki Kaisha, Osaka, Japan

[21] Appl. No.: 862,498

[22] Filed: Apr. 2, 1992

[30] Foreign Application Priority Data

Apr. 5, 1991 [JP] Japan ................... 3-73193

[51] Int. Cl.⁵ .............................................. G06F 3/00
[52] U.S. Cl. .............................................. 364/709.12
[58] Field of Search ............ 364/706, 709.12, 709.16, 364/709.01

[56] References Cited

U.S. PATENT DOCUMENTS

| | | | |
|---|---|---|---|
| 4,901,262 | 2/1990 | Tanaka et al. | 364/709.16 |
| 5,067,102 | 11/1991 | Eisenstein | 364/709.12 |
| 5,109,518 | 4/1992 | Kawawaki et al. | 364/709.12 |
| 5,134,577 | 7/1992 | Kawawaki | 364/709.16 |

FOREIGN PATENT DOCUMENTS 49-38534 4/1975 Japan .
55-138158 10/1980 Japan .
63-159963 7/1988 Japan .

OTHER PUBLICATIONS

Sharp's Manual, "Applications for the Sharp EL-512 Scientific Calculator", published 1983, Chapter 1 part C.

*Primary Examiner*—Long T. Nguyen
*Attorney, Agent, or Firm*—Nixon & Vanderhye

[57] ABSTRACT

A computer is provided which is a so-called arithmetic expression storing type computer and in which a constant calculation mode can be set without additionally installing a key and the function of the constant calculation mode has an enhanced ability. When a rightward cursor is operated under a state that a cursor is positioned at the digit rightward subsequent to an entered expression and a binary operator is entered at the last digit of the expression, an expression which has been entered before the operator is calculated, and the calculated result is scored as a constant. When the rightward cursor is operated again under a state that the constant calculation mode is set, the constant which has been set as a first operand is reset to a second operand. An expression set in the constant calculation mode is displayed on a display screen.

12 Claims, 4 Drawing Sheets

CALCULATOR WITH EASILY ENTERABLE CONSTANT CALCULATION MODE

BACKGROUND OF THE INVENTION

1. Field of the Invention

The present invention relates to a computer which is preferably useful as a portable or desk top computer or the like, which is relatively small in size, and which performs various scientific calculations including the four operations.

2. Description of the Related Art

Computers such as portable or desk top computers which are relatively small in size and perform various scientific calculations including the four operations are widely used. These computers are classified into several types such as a sequential calculation type, and an arithmetic expression storing type. In a sequential calculation type computer, when a number is entered and an operation key or scientific calculations key is operated, the corresponding calculation is immediately carried out. For example, immediately after a number "30" is entered and a scientific calculations, "sin" key is operated thereafter, the calculation of sin 30° (sine of 30°) is done and "0.5" is displayed on a display screen.

In an arithmetic expression storing type computer, when an expression to be calculated is entered and thereafter a predetermined key such as an "=" (equal) key is operated, the calculation of the entered expression is carried out. For example, by operating the "sin" key, entering a number "30" and finally operating the "=" key, the calculation of sin 30° is conducted and "0.5" is displayed on a display screen.

Such a sequential calculation type computer is provided with a constant calculation function. The constant calculation is conducted as follows: an arbitrary number and an arbitrary operator are entered; the entered number is stored as a constant and the operator as an operator for the constant calculation; the constant is set (regarded) as one of a first operand and a second operand: a number entered thereafter is set (regarded) as the other of a first operand and a second operand; and the calculation corresponding the operator for the constant calculation is repeatedly carried out every time a number is entered. An example of the operations in the constant calculation in a sequential calculation type computer is shown in Table 1 below.

TABLE 1

| Key Operation | Constant | Display |
|---|---|---|
| 2 + | Not set | 2 |
| 3 = | 2 + | 5 |
| 4 = | 2 + | 6 |

At first, "2" and "+" are entered, and "2" is displayed on a display screen. Then, when "3" and "=" are entered, "2" is set as a first operand, "+" is set as the operator for the constant calculation, and newly entered "3" is set as a second operand; the calculation between the first operand and the second operand (in this example, the addition) is carried out; and "5" is displayed on the display screen.

When "4" and "=" are entered thereafter. "2" is set as the first operand in the same manner as described above, and entered "4" is set as the second operand. The calculation between the first operand and the second operand (in this example, the addition) is carried out, and "6" is displayed on the display screen.

Generally, an arithmetic expression storing type computer is not provided with such a constant calculation function.

Recently, arithmetic expression storing type computers such as so-called pocket computers having a calculation function enhanced to be higher than that of an arithmetic expression storing type computer are popularly used. In such a pocket computer, a program (calculation procedure) which corresponds to a program language such as BASIC and FORTRAN for a usual computer can be input and executed.

In order to set the constant calculation function, such a pocket computer is provided with a special key called "CONST" key. An example of the operations in the constant calculation in a pocket computer is shown in Table 2 below.

TABLE 2

| Key Operation | Constant | Display | | Indication Sign |
|---|---|---|---|---|
| 2 + | Not set | 2 + — | | |
| CONST | 2 + | > | | CONST |
| 3 | 2 + | 3 — | | CONST |
| ENTER | 2 + | | 5 | CONST |
| 4 ENTER | 2 + | | 6 | CONST |

Firstly, "2" and "+" are entered, and "2+" is displayed on a display screen, further a cursor which indicate an input position is displayed in the digit subsequent to that of "+". When the "CONST" key is operated under this state, the constant calculation mode is set, and a prompt sign, ">" is displayed on the display screen to request the user to conduct a further key entry. At this time, "2" is set as a first operand, and "+" as the operator for the constant calculation. On the display screen, "CONST" is displayed as an indication sign. In this pocket computer, an indication sign denotes the current operation mode of the pocket computer and is kept displayed till the operation mode is canceled. Namely, the indication sign "CONST" is kept displayed till the constant calculation mode is canceled.

When "3" is entered in sequence, "3" is displayed on the display screen and a cursor is displayed in the digit subsequent to that of "3". When an "ENTER" key is then operated to indicate the completion of the entry of a numeric and the initiation of the calculation, "3" is set as a second operand, and the calculation of "2+3" is carried out and the calculation result of "5" is displayed.

When "4" is entered and the "ENTER" key is then operated, "4" is set as a second operand, and the calculation of "2+4" is carried out and the calculation result of "6" is displayed.

In the pocket computer, for example, when "÷" and "2" are entered and the "CONST" key is operated, the constant calculation mode in which "2" is set as a second operand and "÷" as the operator for the constant calculation is set.

The constant calculation function of the sequential calculation type computer is restricted to a calculation in which the initially entered number is treated as an first operand, and cannot perform a constant calculation of another kind in which the initially entered number is set as a second operand and a number entered in later as an first operand.

As described above, an arithmetic expression storing type computer is not provided with a constant calculation function.

In order to execute a constant calculation function, such a pocket computer must be provided with the "CONST" key. This causes a problem in that the number of keys is increased. Moreover, it is required to display "CONST" as an indication sign, the display screen must include a display area for displaying the indication sign "CONST".

SUMMARY OF THE INVENTION

It is an object of the invention to provide a computer in which the constant calculation mode can be set without additionally providing a key and the constant calculation function has an enhanced ability in a so-called arithmetic expression storing type computer.

The computer of the invention comprises: a display unit having a display screen of a plurality of digits; numeral keys for entering a number; operator keys each for entering an operator; and cursor keys for moving a cursor rightward and leftward, the cursor being indicative of an input position on the display screen, the computer displaying an entered expression on the display screen, and when a predetermined key for indicating the completion of the entry of the expression and the initiation of a calculation is operated, computing the entered expression, and is characterized in that, when, under a state that the cursor is positioned at the digit rightward subsequent to an entered expression and an operator is entered at the last digit of the expression, a rightward cursor key for moving the cursor in the right direction is operated, an expression which has been entered before the operator is calculated, and the calculated result is stored as a constant, the operator at the last digit is stored as an operator for a constant calculation, and a constant calculation mode is set in which the constant is regard as a first operand, an entered number is regard as a second operand, and a calculation on the basis of the operator for the constant calculation is repeatedly executed every time a number is entered.

Moreover, the computer of the invention is characterized in that, when, under a state that the constant calculation mode is set, the rightward cursor key is operated, the set state of the constant is changed from a second operand to a first operand and vice versa. In other words, the relationship of setting the constant as a first operand or a second operand is changed when the rightward cursor key is operated in the constant calculation mode.

Furthermore, the computer of the invention is characterized in that, when the constant calculation mode is set, the expression set for the constant calculation is displayed on the display screen.

According to the invention, when the rightward cursor is operated under a state that the cursor is positioned at the digit rightward subsequent to an entered expression and an operator is entered at the last digit of the expression, the expression which has been entered before the operator at the last digit is calculated, the calculated result is stored as a constant, the operator at the last digit is stored as an operator for a constant calculation, and a constant calculation mode is set on the basis of the stored constant and operator for the constant calculation. In this constant calculation mode, while the constant is regard as a first operand and an entered numeric is regard as a second operand, a constant calculation based on the operator for the constant calculation can be repeatedly executed every time a number is entered.

More specifically, a software is so designed that, even when the rightward cursor key is operated under the state that the cursor is positioned at the digit subsequent (right side) to an entered expression or number, the cursor is not moved rightward. Generally, it is meaningless in the view point of the operation characteristics of a computer that, while the entry of an expression or number has not been completed, a subsequent expression or number is entered with leaving a blank after the expression or number which is in the middle of entry. When the cursor is positioned at the digit subsequent to an entered expression or number, therefore, the operation of the rightward cursor key is nullified. In view of this, the computer of the invention is so constructed that the constant calculation mode is set by operating the rightward cursor key under a condition that such an operation is nullified in a prior art. Hence, it is not required for the present computer to be equipped with an additional key dedicated to setting of the constant calculation mode. Furthermore, the present invention can be achieved only by modifying the software and without changing the hardware of a prior art computer.

According to the invention, when the rightward cursor key is operated while the constant calculation mode has been set, the relationship of setting the constant as a first operand or a second operand is changed. In other words, when the constant has been set as the second operand, it is reset to the first operand, and, when the constant has been set as the first operand, it is reset to the second operand.

For example, when the subtraction operator is entered as an operator, accordingly, it is possible to execute two different constant calculations. This is the same in a case that the division operator is entered as an operator.

According to the invention, when the constant calculation mode is set, a character e.g., "x" representing a set constant, an operator for the constant calculation, and a character e.g., "?" representing a numeric to be entered are displayed on the display screen to indicate the expression currently set. This allows the user to visually recognize in a simplified manner that the constant calculation mode is set.

When the constant is set as a first operand, a character representing the set constant, the operator, and a character representing a number to be entered are displayed on the display screen in this sequence. In contrast, when the constant is set as a second operand, a character representing a number to be entered, the operator, and a character representing the set constant are displayed on the display screen in this sequence. This allows the user to visually recognize the expression set in this constant calculation mode, whereby the convenience of a computer is greatly improved.

As described above, according to the invention, when the rightward cursor key is operated under a condition that such an operation is nullified in a prior art, the constant calculation mode is set. Hence, it is not required for the present computer to be equipped with an additional key for setting the constant calculation mode, and the present invention can be achieved only by modifying the software and without changing the hardware of a prior art computer.

Moreover, according to the invention, the relationships of setting the constant and an entered number as a first operand or a second operand can be replaced with each other. For example, when the subtraction operator is entered as an operator, accordingly, it is possible to execute two different constant calculations. This is the same in a case that the division operator is entered as an operator.

Furthermore, according to the invention, when the constant calculation mode is set, the expression of the constant calculation is displayed on a display screen. This allows the user to visually recognize in a simplified manner that the constant calculation mode is set, and also to visually recognize the expression set in the constant calculation mode, whereby the convenience of a computer is greatly improved.

The computer of the invention comprises: a display unit having a display screen of a plurality of digits; expression-entering keys including numeral keys for entering a number, operator keys each for entering an operator and cursor keys for moving a cursor rightward and leftward, the cursor being indicative of an input position on the display screen; a calculation start key for indicating the completion of an entry of an expression and the initiation of a calculation; means for storing an entered expression; and calculation means for displaying an expression on the display screen on the basis of the contents of the expression storing means, for performing a calculation of the entered expression in response to the operation of the calculation start key, and for displaying the calculated result on the display screen, and characterized in that the computer further comprises constant calculation mode setting means for, when, under a state that the cursor is positioned at the digit rightward subsequent to the entered expression and an operator is entered at the last digit of the expression, a rightward cursor key for moving the cursor in the right direction is operated, computing a portion of the expression which has been entered before the operator at the last digit, for storing the calculated result as a constant for a constant calculation, and for storing the operator at the last digit as an operator of the constant calculation, when a constant calculation mode is set, the calculation means regarding the constant for the constant calculation as a first operand, regarding an entered number as a second operand, and being capable of executing repeatedly a calculation on the basis of the operator for the constant calculation every time a number is entered.

The computer of the invention is characterized in that the operator for the constant calculation is an addition operator, the first operand is as augend, and the second operand is an addend.

The computer of the invention is characterized in that the operator for the constant calculation is a subtraction operator, the first operand is a minuend, and the second operand is a subtrahend.

The computer of the invention is characterized in that the operator for the constant calculation is a multiplication operator, the first operand is a multiplicand, and the second operand is a multiplier.

The computer of the invention is characterized in that the operator for the constant calculation is a division operator, the first operand is a dividend, and the second operand is a divisor.

BRIEF DESCRIPTION OF THE DRAWINGS

Other and further objects, features, and advantages of the invention will be more explicit from the following detailed description taken with reference to the drawings wherein.

DETAILED DESCRIPTION OF THE INVENTION

Now referring to the drawings, preferred embodiments of the invention are described below.

Figure 1:
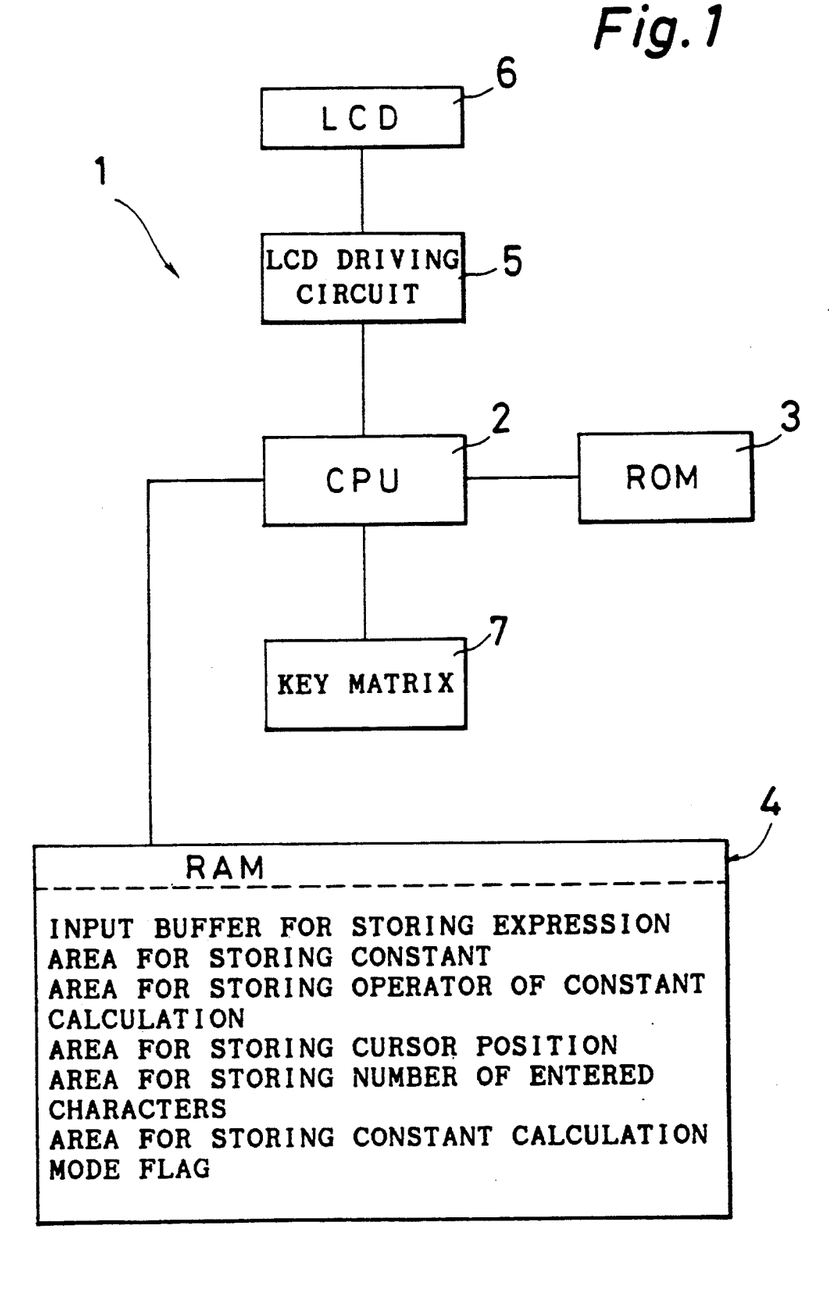
FIG. 1 is a block diagram illustrating the electric configuration of a computer 1 which is an embodiment of the invention.

FIG. 1 is a block diagram illustrating the electrical configuration of a computer 1 which is an embodiment of the invention. The computer 1 comprises a CPU (central processing unit) 2 which controls the whole of the computer 1 and to which a ROM (read only memory) 3 and RAM (random access memory) 4 are connected.

The ROM 3 stores a program for executing various calculations and operation modes in the computer 1, constants necessary for performing various controls on the computer 1, etc. The RAM 4 has a work area which is used in the execution of the program, an input buffer for entering an expression, a storage area for storing the cursor position in the input buffer, the number of entered characters and various numbers, and storage areas for storing a constant, a operator for the constant calculation, a constant calculation mode flag, etc. in the constant calculation mode which will be described later.

A key matrix 7 in which a plurality of keys are arranged is connected to the CPU 2. The CPU 2 scans the key matrix 7 to detect an operated key. Furthermore, a LCD (liquid crystal display device) 6 is connected to the CPU 2 through a LCD driving circuit 5. The LCD 6 has a display screen of a predetermined number of digits and displays numbers and symbols entered via the key matrix 7, or a calculation result, etc.

Figure 2:
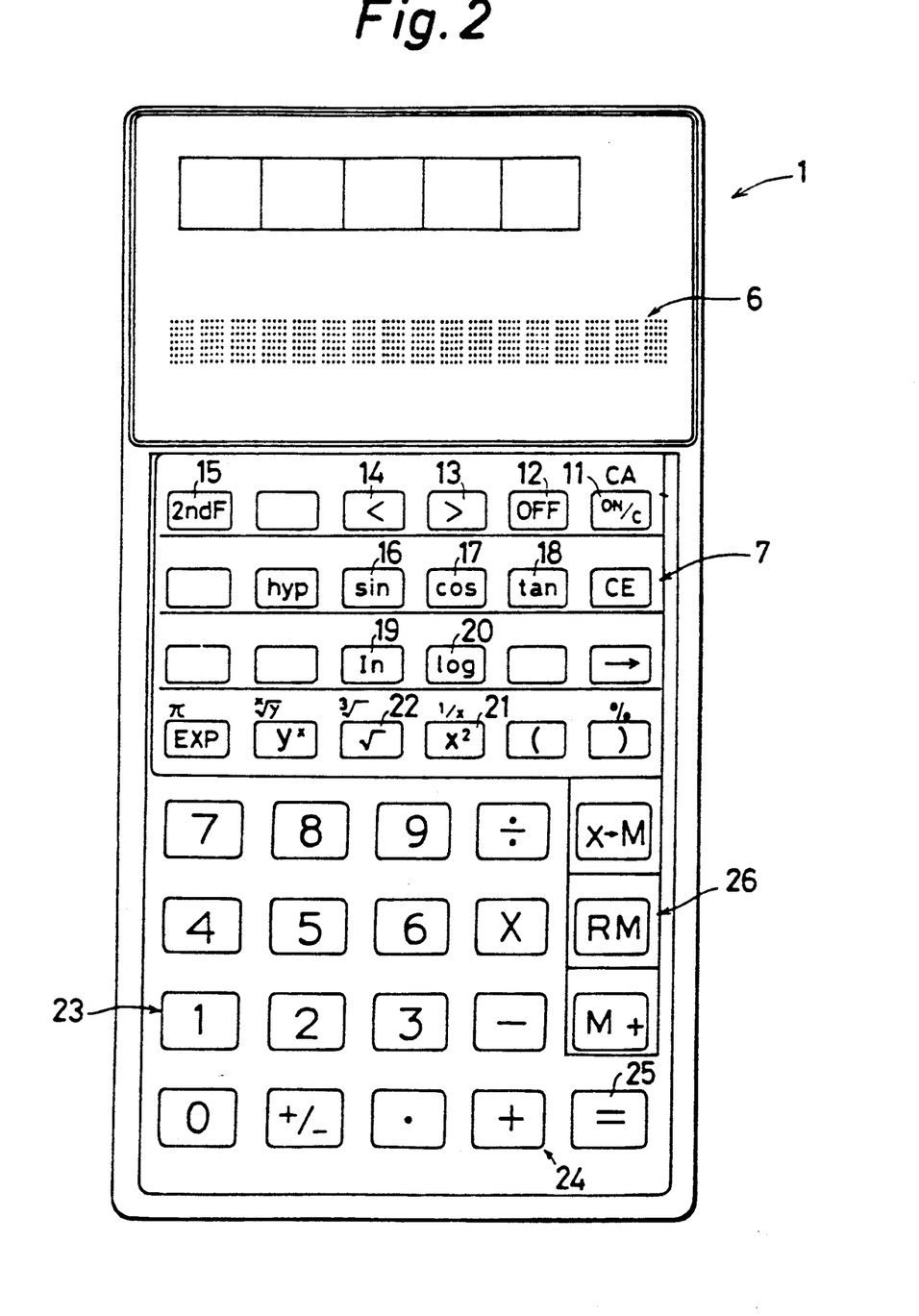
FIG. 2 is a plan view illustrating the key arrangement, etc. of the computer 1.

FIG. 2 is a plan view illustrating the key arrangement, etc. of the computer 1. The LCD 6 is disposed in the upper portion of the computer 1. In the display screen of the LCD 6, a plurality of unit display regions D (in this embodiment, 17 unit display regions) which respectively consist of a plurality of display dots arranged in matrix. Each of the unit display regions constitutes one digit of the display.

The key matrix 7 is disposed under the LCD 6. The uppermost row of the key matrix 7 includes an ON/-CLEAR key 11 for turning the computer 1 on and setting it to the initial state, an OFF key for turning the computer 1 off, a rightward cursor (>) key 13 for moving a cursor rightward on the display screen, a leftward cursor (<) key 14 for moving a cursor leftward on the display screen, and a second-function key 15 which is operated for selecting the function indicated above each of the keys.

The second row of the key matrix 7 includes keys for computing a trigonometric function, namely, a SIN key 16 for obtaining a sine, a COS key 17 for obtaining a cosine, and a TAN key 18 for obtaining a tangent. In the third row, there are an IN key 19 for obtaining the natural logarithm of an entered number, and a LOG key 20 for obtaining the common logarithm of an entered number.

The fourth row of the key matrix 7 includes a square key 21 for obtaining the square of an entered numeric, and a root key 22 for obtaining the square root of an entered number.

Below the various scientific calculations keys and function setting keys arranged in four rows as described above, arranged are numeral keys 23 for entering a number, operator keys 24 for entering operators of the four operations, an equal (=) key 25 which indicates the completion of the entry of an expression and the initiation of the calculation, and memory keys 26 which are operated in the calculation using a memory.

Figure 3:
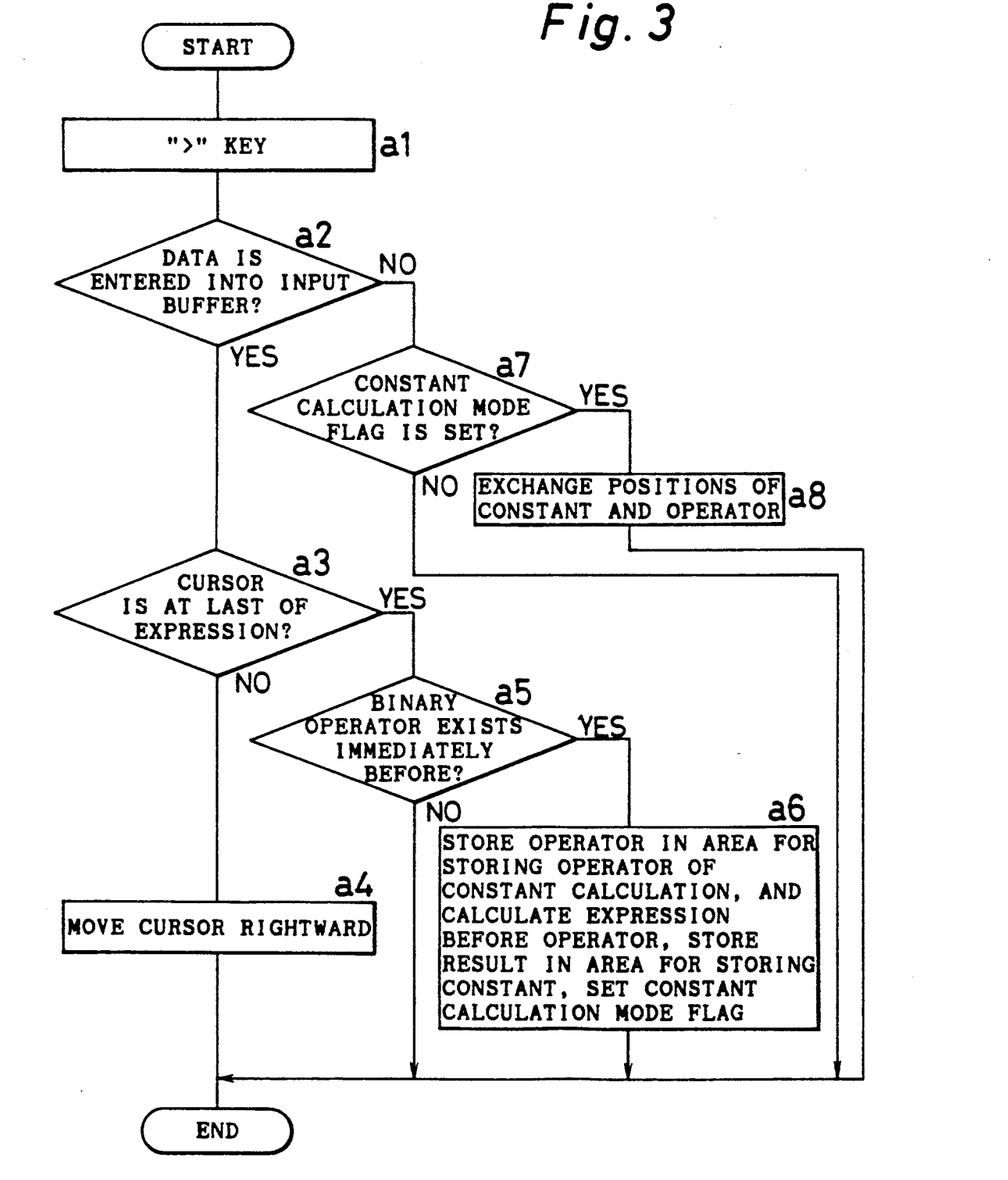
FIG. 3 is a flowchart illustrating the process of operating a key for setting the constant calculation mode in the computer 1.

FIG. 3 is a flowchart illustrating the process of operating a key (rightward cursor key 13) for setting the constant calculation mode in the computer 1. When the rightward cursor key 13 is operated in step a1, it is determined in step a2 whether data is entered into the input buffer of the RAM 4. When data is entered into the input buffer, the process proceeds to step a3, and, when data is not entered into the input buffer, the process proceeds to step a7.

In step a3, the data indicative of the cursor position and stored in the RAM 4 is compared with the number of entered characters in the input buffer to determine whether the cursor is positioned at the end of the entered expression. In other words, it is determined whether the cursor is positioned at the digit subsequent to the last numeric or operator of the entered expression. When the cursor is not positioned at the end of the entered expression, the process proceeds to step a4 to move the cursor rightward.

When the cursor is positioned at the end of the entered expression, it is determined in step a5 whether a binary operator is entered at the digit immediately before the cursor. When a binary operator is not entered at that digit, the operation of the rightward cursor key 13 is nullified. When a binary operator is entered at that digit, the process proceeds to step a6 wherein the binary operator is stored in the constant calculation operator storage area and the expression previous to the binary operator is calculated. The calculated result is stored in the constant storage area, and the constant calculation mode flag is set.

In step a7, it is determined whether the constant calculation mode flag is set. When the constant calculation mode flag has not been set, the process is ended. When the constant calculation mode flag has been set, in step a8, the positional relationship between the constant and the operator is inverted. Namely, when the constant has been set as the first operand, it is reset to the second operand, and, when the constant has been set as the second operand, it is reset to the first operand.

Figure 4:
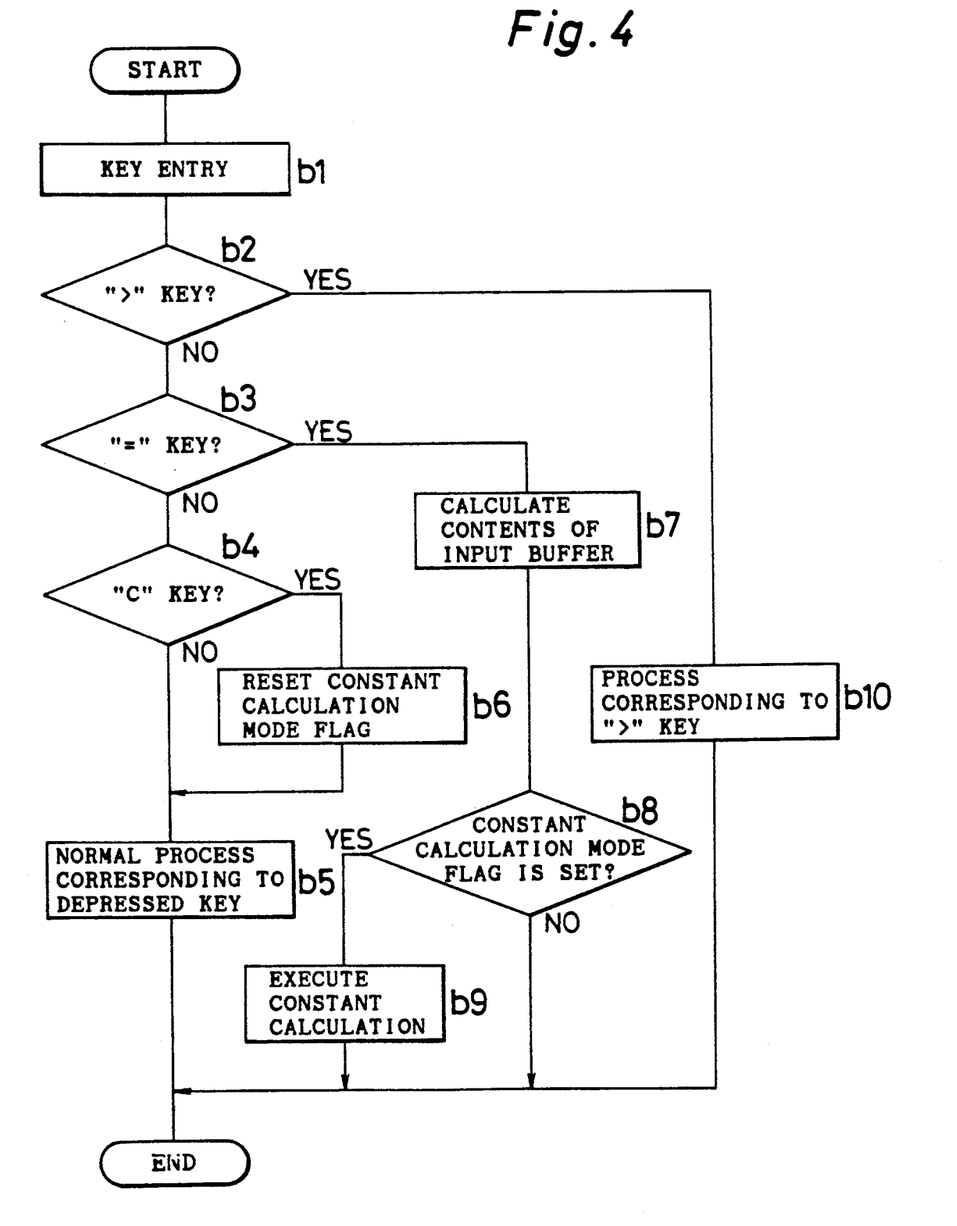
FIG. 4 is a flowchart illustrating a general flow of operations performed when a key entry has been done in the computer 1, and also illustrating the timing of executing a constant calculation and resetting a constant calculation mode flag.

FIG. 4 is a flowchart illustrating the execution of a constant calculation in the constant calculation mode, and the timing of resetting the constant calculation mode flag which has been set in the process of FIG. 3. When a key entry is performed in step b1, it is determined in step b2 whether the rightward cursor key 13 has been operated in that key entry. When the rightward cursor key 13 has been operated, the process proceeds to step b10 to execute the process of FIG. 3 which is to be performed when the rightward cursor key 13 has been operated.

When the rightward cursor key 13 has not been operated, the process proceeds to step b3 to determine whether the equal key 25 has been operated in the key entry of step b1. When the equal key 25 has been operated, the process advances to step b7, and when the equal key 25 has not been operated, the process to step b4.

In step b4, it is determined whether the ON/CLEAR key 11 has been operated in the key entry of step b1. When the ON/CLEAR key 11 has been operated, the process advances to step b6, and when the ON/CLEAR key 11 has not been operated, the process to step b5.

In step b6, the constant calculation made is canceled, that is, the constant calculation mode flag is reset. Then, the process proceeds to step b5 to execute the normal operation corresponding to the ON/CLEAR key 11.

In step b5, irrespective of the current mode (i.e., whether the constant calculation mode is set or not), the normal operation corresponding to the key operated in step b1 is carried out.

In step b7, the contents of the input buffer are calculated, and the process proceeds to step b8.

It is determined in step b8 whether the constant calculation mode flag has been set. When the constant calculation mode flag has been set, the process proceeds to step b9 in which a constant calculation is carried out in accordance with the constant, the operator of the constant calculation and the number obtained in step b7, and the number obtained in this calculation is output as the calculated result. When the constant calculation mode flag has not been set, the process is ended without executing further operation, and the numeric obtained in step b7 is output as the calculated result.

With reference to Tables 3 to 5 below specific examples of key operations and displays of the computer 1 in the case that the computer 1 is an arithmetic expression storing type computer will be described. Table 3 shows the most basic example.

TABLE 3

| Key Operation | Constant | Display | |
|---|---|---|---|
| 2 + | Not set | 2+ — | |
| > | 2 + | x+? | — |
| 3 = | 2 + | x+? | 5 |
| 4 = | 2 + | x+? | 6 |

When "2" and "+" are entered by operating the numeral and operator keys 23 and 24, "2+" is displayed at the left end portion of the display screen, and the cursor is displayed at the digit subsequent to the display of "2+". When the rightward cursor key 13 is then operated, "2" is stored as the first operand and "+" is stored as the operator of the constant calculation. On the display screen, "x+?" is displayed at the left end portion as the expression in the constant calculation mode, and the cursor at the right end portion. Since the expression of the constant calculation mode currently set is displayed on the display screen, the user can recognize by viewing the displayed expression that the computer 1 is set to the constant calculation mode.

When "3" and "=" are entered thereafter. "3" is set as the second operand (addend), and "5" is displayed as a result of the calculation of "2+3". When "4" and "=" are entered further, "4" is set as the second operand, and "6" is displayed as a result of the calculation of "2+4". In this way, by entering a desired number and then operating the "=" key, the constant calculation for the entered numeric can be repeatedly executed.

Table 4 shows an example of key operations conducted when a constant which has been set as an first operand is to be reset to a second operand.

TABLE 4

| Key Operation | Constant | Display | |
|---|---|---|---|
| 2 – > | 2 – | x – ? | – |
| > | – 2 | ? – x | – |
| 3 = | – 2 | ? – x | 1 |
| 4 = | – 2 | ? – x | 2 |

When the entering of "2" and "–" is followed by the operation of the rightward cursor key 13, "2" is stored as the first operand and "–" is stored as the operator of the constant calculation as described above. On the display screen, "x–?" is displayed as the expression in the constant calculation mode, and the cursor is displayed at the right end.

When the rightward cursor key 13 is operated under this state, "2" is stored as a second operand, and therefore "?–x" is displayed as the expression on the display screen. In this way, the setting position of the constant can be changed by operating the rightward cursor key 13 when the constant calculation mode has been set. In other words, when the constant has been set as the second operand, it is reset to the first operand, and, when the constant has been set as the first operand, it is reset to the second operand. Therefore, it is possible to set two different expressions in the constant calculation mode for a single operator, whereby the applicable scope of the constant calculation mode can be expanded.

When "3" and "=" are entered thereafter in the same manner as described above, "3" is set as the first operand (minuend), and "1" is displayed as a result of the calculation of "3–2". When "4" and "=" are entered further, "2" is displayed as a result of the calculation of "4–2". In this way, by entering a desired number and then operating the "=" key, the constant calculation for the entered numeric can be repeatedly executed.

Table 5 shows an example of key operations conducted in a case that an expression has been already entered in advance of the operation of the rightward cursor key 13.

TABLE 5

| Key Operation | Constant | Display | |
|---|---|---|---|
| 2 × 3 ÷ | Not set | 2×3÷ – | |
| > | 6 ÷ | x÷? | – |
| 4 = | 6 ÷ | x÷? | 1.5 |

When the entering of "2", "X", "3" and "÷" is followed by the operation of the rightward cursor key 13, the calculation of "2×3" is executed, the calculated result of "6" is stored as a constant and "÷" is stored as the operator of the constant calculation as described above. On the display screen, "x÷?" is displayed at the left side portion as the expression of the constant calculation mode currently set, and the cursor is displayed at the right end portion. In this way, in a case that when the rightward cursor key 13 is operated a binary operator exists just before the cursor, the expression entered in advance of the input of the binary operator is calculated, and the calculated result is stored as the constant. This allows the applicable scope of the constant calculation mode to be expanded.

When "4" and "=" are entered thereafter, "4" is set as the second operand (divisor), and "1.5" is displayed as a result of the calculation of "6÷4". In the same manner as described above, also in this case, by entering a desired number and then operating the "=" key, the constant calculation for the entered numeric can be repeatedly executed. When the rightward cursor key 13 is operated again under this state, the constant "6" is stored as the second operand, and "?÷x" is displayed as an expression on the display screen.

As described above, according to the embodiment, by operating the rightward cursor key 13, the computer 1 is set to the constant calculation mode. Hence, unlike a prior art computer, it is not required for the present computer to be equipped with a "CONST" key dedicated to setting of the constant calculation mode. Furthermore, the present invention can be embodied only by modifying the software and without changing the hardware of a prior art computer.

When the rightward cursor key 13 is further operated while the constant calculation mode has been set, the set state of the constant is changed from a second operand to a first operand and vice versa. Therefore, it is possible to set two different expressions in constant calculation mode for a single operator, whereby the applicable scope of the constant calculation mode can be expanded.

When the constant calculation mode is set, the expression currently set is displayed on the display screen. By viewing the displayed expression, therefore, the user can recognize that the computer is set to the constant calculation mode and know what kind of expression is set. Accordingly, it is not required to display "CONST" on the display screen as a sign indicative of the setting of the constant calculation mode as done in a prior art pocket computer or the like.

Although examples of constant calculations in the four operations have been described above, the invention can be applied to constant calculations using other binary operators such as power, permutation and combination.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and the range of equivalency of the claims are therefore intended to be embraced therein.

What is claimed is:

1. A computer comprising:
   a display unit having a display screen of a plurality of digits;
   numeral keys for entering a numeric;
   operator keys each for entering an operator; and
   cursor keys for moving a cursor rightward and leftward, the cursor being indicative of an input position on the display screen,
   the computer displaying an entered expression on the display screen, and, when a predetermined key for indicating the completion of the entry of the expression and the initiation of a calculation is operated, computing the entered expression, wherein;
   when, under a state that the cursor is positioned at the digit rightward subsequent to an entered expression and an operator is entered at the last digit of the expression, a rightward cursor key for moving the cursor in the right direction is operated, an expression which has been entered before the operator is calculated, and the calculated result is stored as a constant, the operator at the last digit is stored as an operator for a constant calculation, and a constant calculation mode is set in which the constant is regard as a first operand, an entered numeric is regard as a second operand, and a calculation on the basis of the operator for the constant calculation is repeatedly executed every time a numeric is entered.

2. A computer as claimed in claim 1 wherein when, under a state that the constant calculation mode is set, the rightward cursor key is operated, the set state of the constant is changed from a second operand to a first operand and vice versa.

3. A computer as claimed in claim 1 wherein, when the constant calculation mode is set, the expression set for the constant calculation is displayed on the display screen.

4. A computer as claimed in claim 1, wherein, the operator for the constant calculation is an addition operator, the first operand is as augend, and the second operand is an addend.

5. A computer as claimed in claim 1 wherein, the operator for the constant calculation is a subtraction operator, the first operand is a minuend, and the second operand is a subtrahend.

6. A computer as claimed in claim 1 wherein, the operator for the constant calculation is a multiplication operator, the first operand is a multiplicand, and the second operand is a multiplier.

7. A computer as claimed in claim 1 wherein, the operator for the constant calculation is a division operator, the first operand is a dividend, and the second operand is a divisor.

8. A computer comprising:

a display unit having a display screen of a plurality of digits;

expression-entering keys including numeral keys for entering a numeric, operator keys each for entering an operator and cursor keys for moving a cursor rightward and leftward, the cursor being indicative of an input position on the display screen;

a calculation start key for indicating the completion of an entry of an expression and the initiation of a calculation;

means for storing an entered expression; and calculation means for displaying an expression on the display screen on the basis of the contents of the expression storing means, for performing a calculation of the entered expression in response to the operation of the calculation start key, and for displaying the calculated result on the display screen, wherein;

the computer further comprising;

constant calculation mode setting means for, when, under a state that the cursor is positioned at the digit rightward subsequent to the entered expression and an operator is entered at the last digit of the expression, a rightward cursor key for moving the cursor in the right direction is operated, computing a portion of the expression which has been entered before the operator at the last digit, for storing the calculated result as a constant for a constant calculation, and for storing the operator at the last digit as an operator of the constant calculation, when a constant calculation mode is set, the calculation means regarding the constant for the constant calculation as a first operand, regarding an entered numeric as a second operand, and repeatedly executing an calculation on the basis of the operator for the constant calculation every time a numeric is entered.

9. A computer comprising:

a display screen;

an input means; and a control means connected to the display screen and the input means, for driving the display screen in response to the input means and for determining when the computer is to enter a constant calculation mode, the control means making the determination to enter a constant calculation mode in response to signals from the input means that cause a cursor displayed on the display screen to have a predetermined position relative to data displayed on the display screen, the cursor being generated in response to a corresponding predetermined cursor key on the input means, the predetermined cursory key causing the control means to enter the constant calculation mode and perform a constant calculation.

10. A computer as claimed in claim 9, wherein the control means makes the determination to enter the constant calculation mode when the cursor is displayed on the display screen at the end of an expression, and a binary operator is displayed in the expression immediately before the cursor.

11. A computer as claimed in claim 9, further comprising memory means, and wherein upon entering the constant calculation mode the control means stores an operator in a first memory location of the memory means, performs a calculation and stores the result of the calculation in a second memory location of the memory means, and sets a constant calculation flag in a third memory location of the memory means.

12. A computer as claimed in claim 11, wherein the memory means further includes a buffer wherein data is stored in response to the input means, the data also being displayed on the display screen by the control means, and wherein the control means is responsive to a signal from the input means indicating that the predetermined cursor is displayed for exchanging the contents of the first memory location and the second memory location if data has not been entered into the buffer.

* * * * *